United States Patent [19]

Michael

[11] Patent Number: 5,042,310
[45] Date of Patent: Aug. 27, 1991

[54] METHOD FOR THE DETERMINATION OF AREA OF DRAWINGS AND DEVICE FOR IMPLEMENTING THE SAME

[76] Inventor: Marinakis Michael, Anogion 10, Misiria, Rethymnon, 74100, Greece

[21] Appl. No.: 353,599

[22] Filed: May 18, 1989

[30] Foreign Application Priority Data

Apr. 26, 1989 [GR] Greece .............................. 890100287

[51] Int. Cl.$^5$ ...................... G01B 21/28; G01B 11/28; G01G 19/00
[52] U.S. Cl. ........................................ 73/865.8; 177/50
[58] Field of Search ...................... 73/865.8, 865, 159; 177/50

[56] References Cited

U.S. PATENT DOCUMENTS

| | | | |
|---|---|---|---|
| 3,264,878 | 8/1966 | Balog | 73/159 X |
| 3,405,555 | 10/1968 | Wissinger et al. | 73/159 |
| 3,755,659 | 8/1973 | Bolhuis | 73/865.8 X |
| 4,441,819 | 4/1984 | Takeuchi et al. | 356/380 |
| 4,476,717 | 10/1984 | Murphy | 73/159 |
| 4,548,285 | 10/1985 | Sells et al. | 73/865 X |
| 4,678,336 | 7/1987 | Tsunoda | 356/380 |
| 4,800,287 | 1/1989 | Green, Sr. et al. | 356/380 X |

FOREIGN PATENT DOCUMENTS

| | | | |
|---|---|---|---|
| 1548170 | 8/1969 | Fed. Rep. of Germany | 73/159 |
| 2058551 | 3/1978 | Fed. Rep. of Germany | 73/159 |
| 142464 | 6/1986 | Japan | 73/159 |
| 151499 | 11/1962 | U.S.S.R. | 73/159 |
| 643745 | 1/1979 | U.S.S.R. | 73/865.8 |
| 1368783 | 1/1988 | U.S.S.R. | 73/865.9 |

*Primary Examiner*—Tom Noland

[57] ABSTRACT

The invention refers to a method for the determination of the area of drawings which have been drawn on paper sheet or other like drawing material and to a device for implementing the method. In the method of the invention a natural quantity and in particular the weight of the paper sheet or other drawing material is used in correlation to the surface area of the same, in order to determine a coefficient of correlation of weight per unit area of the drawing material. By means of cutting off and weighing that portion of the paper sheet or other like drawing material, one can thus and after having calculated the abovementioned coefficient of correlation of weight per unit area determine the area of the desired portion.

4 Claims, 1 Drawing Sheet

METHOD FOR THE DETERMINATION OF AREA OF DRAWINGS AND DEVICE FOR IMPLEMENTING THE SAME

THE FIELD OF THE INVENTION

The present invention relates to the field of the art of techniques, means, instruments, tools and devices suitable for the determination of area in drawings of all kinds and any shape, linear, curved or irregular.

THE PRIOR ART

The determination of area of drawings is an operation absolutely necessary in the production process. There have therefore been many, both theoretical and experimental efforts to provide adequate solutions to this matter. Thus, there have for example been devised theoretical, geometric techniques for the determination of the area of all regular geometrical shapes, such as for example the square, parallelogram, triangle, circle, ellipse, parabola, etc. Nevertheless, in order to calculate the area, even of these regular surfaces, one needs to know and accordingly measure certain elements, such as the side of the square or the two sides of the rectangle or the radius of the circle. It is furthermore well known that the above methods of calculation do not provide an absolutely precise measurement of the area of certain shapes, such as by way of example of the circle. It is well known that the precise theoretical calculation of the area of a circle, i.e. the well known question of expressing in sq.cm or sq.mm the area of the circle is impossible to answer.

Furthermore, when one has to measure the area of many irregular shapes, even if they are linear, when it is made by means of theoretical calculation employing the well established geometrical formulae, it consists in dividing the irregular shape in a suitable number of smaller regularly shaped sections. Such a procedure does not, however, always guarantee the accuracy of the result, whereas in the same time it is a laborious and time-consuming procedure.

It is for the above reasons that science has made efforts to provide technological solutions, i.e. to design instruments suitable for the determination of area in drawings of all kinds of shapes, i.e. instruments capable of carrying out this operation in a fast, handy and fully reliable manner. In this respect, several manually operated instruments (planimeters) have therefore been developed, which are capable of following the course defined by the external perimeter of the drawing line by means of a rolling sharp edge of the instrument, whereby it is possible to express the course covered—either positive or negative—by the sharp edge of the instrument into surface area of the inscribed drawing area, when the rolling sharp edge returns to the point where it started from and the course is completed. Nevertheless, even when using such instruments and measurement techniques, it is not possible to determine in an absolutely precise manner the surface area, since this technique is dependent upon the stability with which the human hand can prescribe the abovementioned course along the perimeter of the drawing and furthermore because this process despite of the fact that it contributed towards a technological evolution in the field, remains a laborious and time-consuming operation.

SUMMARY

It is therefore the object of the present invention to efffectively overcome the abovementioned disadvantages and drawbacks of the prior art and thereby provide a method of determination of area in drawings of any shape and form, which will provide speed combined with the highest accuracy and reliability.

The main idea comprising the subject matter of the present invention is the reduction of the problem of surface area measurement into another problem consisting in the measurement of another variable quantity, which can be measured in an absolutely precise manner, and in the subsequent reduction of the value obtained into the desirable units in which area is measured.

It is therefore an object of the method of the present invention to define and choose among such variable quantities, which can be measured in an absolutely precise manner, as long as it is possible to correlate in an absolutely precise manner the value of the measured quantity to the ultimate aim of the measurement, i.e. the surface area of the specific drawing.

Such a quantity, suitable for implementing the method of the present invention is the weight of the drawing paper. The weight is an appropriate natural quantity, since it is possible to define in an absolutely precise manner the coefficient of correlation of the weight to the drawing area and thereafter to use this coefficient in converting any weight units to the desired units of area. Thus, without excluding the possibility of employing other natural quantities as well, by means of the actual measurement of which it is possible to determine the area covered by a certain drawing, the weight is selected as a simple, immediately applicable, highly accurate and reliable, as well as a low cost solution.

Following the selection of weight as the actually measurable quantity, the determination of which can accurately lead to the determination of the area of a certain drawing, a further object of the invention is to provide applicable solutions, and in particular to provide solutions which will match the present state of the art in ensuring the maximum accuracy, speed and reliability, and most desirably devices embodying the maximum possible level of automation.

Finally, an object of the present invention is to accomplish an intervention in the field of production and trade of drawing paper, aiming to an appropriate standardization of its size, weight and dimensions in order to facilitate implementation of the method of the present invention.

These and other objects, aims, characteristics and merits of the present invention will be made apparent and clear in the following analytical description of the invention.

BRIEF DESCRIPTION OF THE DRAWINGS

The present invention will be made most fully apparent to those skilled in the art by reference to the accompanying drawings.

DETAILED DESCRIPTION

Figure 1:
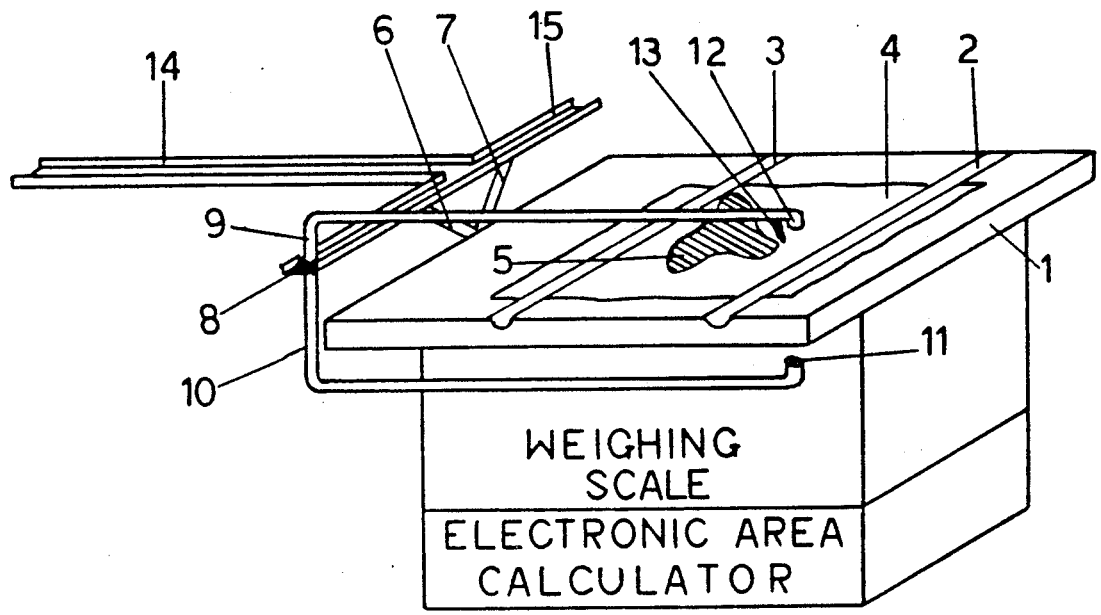
FIG. 1 shows a perspective diagram of the device for the automatic determination of the area of drawings of any shape depicted onto a paper sheet or other like drawing material, which in accordance to the invention comprises a weighing scale, an electronic area calculator, a transparent table onto which the paper sheet or other like drawing material is mounted and an arrangement of tracing and subsequently cutting along the perimeter of the drawing depicted onto the paper sheet or other like drawing material.
Figure 2:
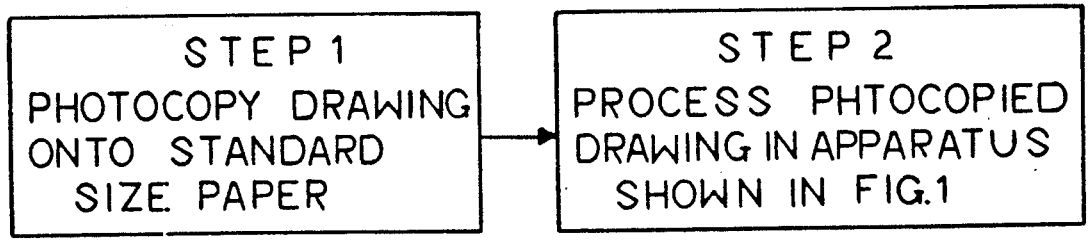
FIG. 2 shows a flowchart indicating a first step of photocopying the prototype drawing if it is not a standardized product with known coefficient of correlation of its weight to the drawing area into a standardized process photocopied drawing prior to its introduction in the apparatus shown in FIG. 1.

The distinct parts and accessories of the proposed device are defined underneath in the order corresponding to the order of their reference numerals in the accompanying drawing:

1. Transparent table, whereupon the sheet of paper with the drawing area to be measured, is mounted.

2,3. Pair of retainer arms to keep the sheet of paper firmly upon the table 1.

4. Sheet of paper whereupon the area to be measured is depicted.

5. Drawing, the area of which is to be measured.

6,7. Pair of members supporting the arrangement of tracing and cutting along the perimeter of the drawing, provided at one side of the table, onto which the sheet of paper is mounted.

8. Bearing onto which the above tracing and cutting arrangement is rotatably mounted.

9. Supporting member, extending upwards the bearing 8, comprising a photo-sensitive element and a cutting blade, of the arrangement of tracing and cutting along the perimeter of the drawing.

10. Supporting member, extending downward the bearing 8, comprising a cource of emission of a thin, linear lightbeam, of the arrangement of tracing and cutting along the perimeter of the drawing.

11. Source of emission of a thin, linear lightbeam.

12. Photo-sensitive element.

13. Cutting blade.

14,15. Pair of axes, within which moves the abovementioned arrangement of tracing and cutting along the perimeter of the drawing.

ANALYTICAL DESCRIPTION OF THE INVENTION

Referring now to the accompanying drawings, we will describe certain illustrative, preferred embodiments of the method for the determination of drawing area of the present invention, which in accordance to one preferred embodiment of the invention comprises the following stages: A first stage in which the sheet of paper onto which the drawing the area of which has to be measured is depicted.

A second stage in which calculation made of the coefficient ($\epsilon$) of correlation of the weight of the drawing paper to the area of the drawing, which has been drawn thereupon, this coefficient being the result of the division of the area (E) of the sheet of paper which is calculated from its dimensions, to the weight (W) of the same which is obtained from weighing in the first stage, where the coefficient $\epsilon = E/W$ constitutes an indicator of the area of drawing paper per unit weight.

A third stage in which the outline along the perimeter of the drawing is traced in order to define the cutting line and eventually cutting the sheet of paper along the thereby defined course, and A fourth stage of weighing with absolute accuracy the portion of the sheet of paper which has been cut off, onto which the drawing whose area has to be measured is depicted.

Following the abovementioned weighing of the cut off portion of the sheet and using the previously calculated coefficient of correlation of the weight to the area of the drawing paper, the area of the drawing is eventually calculated.

By way of example, let us assume that weighing of the portion of the sheet of paper which has been cut off during the abovementioned fourth stage of the method of the invention, results to a weight (W') and let us call (E') the required area of the drawing. Then, $E' = \epsilon \times W'$ in units of area and if the drawing has been drawn in a certain scale, e.g. 1:100, then the actual area is $E' \times 100$ units of area.

In accordance to an illustrative embodiment of the invention, as depicted in the accompanying drawing, the above method is implemented by means of a device, which comprises the following basic parts:

An arrangement for the introduction and fixedly mounting of the sheet of paper or other drawing material, onto which the drawing to be measured is depicted. By way of example, this arrangement comprises a thin table 1, made from glass or other transparent material of suitable dimensions, depending on the dimensions of the introduced sheets of paper 4. The above mentioned table 1 is provided with a means of fixedly mounting the introduced sheet of paper, such as for example a pair of retainer arms 2 and 3, which are hinged in a parallel arrangement and are superimposed onto the sheet of paper along at least two parallel sides of the same. It must be noted that by the arrangement of introduction is meant a suitable opening of a certain housing of the device, through which the sheet of paper in introduced.

Furthermore, the device comprises an arrangement for weighing the introduced paper sheet to determine the abovementioned coefficient of correlation of the weight to the area of the drawing. This arrangement can be a balance, capable of an accuracy of one thousandth of a gram, so as to deem the method for the determination of drawing area of the invention highly reliable. This same balance is preferably used in carrying out the work of the second weighing of the cut off portion of the sheet of paper and is basically located prior to the arrangement of the transparent table 1, onto which the drawing paper to be cut is mounted. In accordance to an illustrative, preferred embodiment of the invention, the same table 1 can be a weighing balance both of the initially introduced sheet of paper and of the finally cut of portion of sheet, depicting the drawing, the area of which is required.

In accordance to another preferred embodiment of the invention the initial stage of weighing and measuring of the respective area of the drawing paper in order to determine the coefficient of correlation of the weight to the area of the specific drawing paper may be eliminated. This is made possible when standardised paper sheet or other drawing material products are employed, whose coefficient of correlation of weight to area is known beforehand. Such standardised drawing paper sheet products can have a broad demand, following application of the device of the present invention.

Alternatively, in accordance to another illustrative, preferred embodiment of the invention, the proposed device and method further comprises a stage of photocopying the prototype drawing sheet into a standardised paper sheet with a known coefficient of corelation of its weight to its area, which is subsequently used to perform the cutting and weighing of the cut off portion, in order to determine the ara of the drawing. The abovementioned photocopying apparatus must obviously be of an absolute accuracy, so as to exclude the possibility of distorting the resulting value of the area under measure, whilst it might be either embodied in the proposed device or it might be an independent common photocopying apparatus, located immediately before the proposed device of the invention.

The proposed device may further in accordance to a preferred embodiment of the invention comprise an embodied electronic arrangement for the calculation of the above-mentioned coefficient of correlation of the weight to the area of the drawing sheet and for determining the value of the area of the drawing, following weighing of the cut off portion of the drawing sheet, where such determination is carried out through internal calculations of the proposed electronic arrangement, following a prior input through a suitable keyboard of the required figures.

If a standardised drawing sheet is employed, the known coefficient ($\epsilon$) of correlation of weight to area is directly introduced in the keyboard of the abovementioned electronic calculating arrangement, whereas if this coefficient is not known, one has to input through the keyboard, first the value of the total area (E) of the drawing paper and second the value of the weight (W) of this same drawing paper, so that following a division, the coefficient ($\epsilon$) may be determined and stored into a suitable memory unit of the same electronic arrangement. Subsequently, following weighing of the cut-off portion of the drawing sheet and entering through the keyboard of the outcome of such weighing, the required area of the drawing is made directly available in units of area. The scale of the drawing may also be entered through the keyboard of the above electronic arrangement, so as to determine the value of the actual area of the depicted drawing.

Furthermore, the abovementioned operations in the method and device of the present invention can be either wholly or partially simulated and carred out through a computer with the appropriate software, or alternatively the device of the invention may constitute part or extension of the well known electronic plotters.

The device of the invention further comprises an arrangement tracing the outline along the perimeter of the depicted drawing and thereby defining the cutting line and eventualy cutting off the drawing along this previously defined cutting line.

In accordance to an illustrative, preferred embodiment of the invention, as depicted in the accompanying drawing, the proposed arrangement of tracing and cutting along the perimeter of the drawing comprises a photo-sensitive element 12, which is provided at the extending end of a suitable member above the transparent table 1, whereas a source of emission of a thin, linear lightbeam 11 is provided vertically downwards, underneath the abovementioned photo-sensitive element 12, at the extending end of another member.

The photo-sensitive element 12 and the source of emission of the thin, linear lightbeam 11 must be situated along the same vertical line, so as to ensure that the lightbeam emitted from the source 11 is directed onto the photo-sensitive element 12 and if this is the case the cutting means 13 (cutting blade, laser beam or other desired cutting means) remains above the drawing sheet, whilst when the abovementioned lightbeam is interrupted by the external outline of the perimeter of the drawing, the cutting means 13 comes down and cuts along the hereby defined line of cutting.

The arrangement of tracing the outline of the perimeter of the drawing comprises members 9 and 10, at the ends of which there is provided the photo-sensitive element 12 and the source of emission of the thin, linear lightbeam 11, respectively. The members 9 and 10 move simultaneously, being rotatably mounted within a bearing which is fixedly supported by the arms 6 and 7 connected at the end of the table. The bearing 8 can slide within the pair of axes 14 and 15, thereby ensuring the two dgrees of freedom of movement, necessary to implement the process of tracing the outline of the perimeter of the drawing.

Alternatively, in order to accelerate the abovementioned process, the traced course may initially be stored in a suitable memory unit of a computer with the appropriate software, and the same stored course may be subsequently retrieved and followed automatically by the abovementioned cutting means. The described arrangement of tracing the outline of the drawing in order to define the cutting line is merely illustrative and any other desired arrangement of suitable technology may also be beneficially employed to implement the same operation.

The above description renders clear and apparent the merits as to speed, accuracy and reliablility of the method and device for the determination of area of drawings of the present invention. The field of applications of the invention is very broad and it brings forward a rational revision of many established modes of the production process. The provision of such a simple and economic means for the determination of the area of drawings substantially enlarges the abovementioned applications to other fields such as the determination of the area of land which has been depicted in air photograms at a certain scale, whereas the method of the invention might in some cases render unecessary the work of surveyors to establish by means of measurement the area of a certain piece of land. By way of example, the device of the present invention might also be used to verify the accuracy of production of enlarged or reduced photocopies, whereas the proposed device might constitute a component part of such a machine.

It must hereby be noted that the description of the present invention was made by reference to illustrative and not restrictive examples. Thus, any change or amendment relating to the shape, size, dimensions, materials and accessories used in the construction and assemblying process, as long as they do not constitute a new inventive step and do not contribute towards a technical innovation, must be considered part of the scope and the aims of the present invention.

The main characteristic features of the present invention are summarized in the following claims:

I claim:

1. Device for the automatic determination of the area of any shape depicted onto a paper sheet or other like drawing material by means of weighing said paper sheet or other like drawing material where at first the entire said paper sheet or other like drawing material is weighed to determine the coefficient of correlation of its weight to the drawing area and secondly a portion cut-off from said paper sheet or other like drawing material whereupon the drawing the area of which has to be measured is depicted is weighted, subsequently converting into area units the obtained result of such weighing of the cut-off portion of said paper sheet or other drawing material, taking into account the previously defined coefficient of correlation of weight to area, comprising an arrangement of introduction and fixedly mounting of the paper sheet or other like drawing material upon a transparent table of suitable dimensions, onto which said paper sheet or other like drawing material is fixedly mounted by means of a pair of retainer arms hinged alongside the said tranparent table and an arrangement of tracing and subsequently cutting the outline along the perimeter of the drawing, said tracing and subsequently cutting arrangement comprising a photo-sensitive element and a cutting means mounted at the center of a pair of normal axes with two degrees of freedom of movement above the said transparent table and a source of emission of a thin, linear lightbeam underneath the said transparent table, where the said photosensitive element moves along the outline of the perimeter of the drawing and where the lightbeam emitted from the said source of emission of a thin, linear lightbeam is interrupted by means of said outline of the perimeter of the drawing and then the said cutting means cuts the sheet along the course defined by the said photo-sensitive element, whereas the said cutting means raises automatically above the said drawing sheet when the lighbeam emitted from the said source of emission of a thin, linear lighbeam is intercepted by the vertically upwards located photo-sensitive element.

2. Device for the automatic determination of the area of drawings of any shape depicted onto a paper sheet or other like drawing material, in accordance to the above claim 1, where the paper sheet or other like drawing material used is a standardized product with known coefficient of correlation of its weight to the drawing area.

3. Device for the automatic determination of the area of drawings of any shape depicted onto a paper sheet or other like drawing material, in accordance to the above claim 1, where the prototype paper sheet or other like drawing material used is not a standardized product with known coefficient of correlation of its weight to the drawing area and it is photocopied by means of a conventional available photocopying machine working with paper input which is of the standardized type with known coefficient of correlation, of its weight to the drawing area, where the subsequent cutting and weighing operation with the cut-off portion of the paper sheet or other drawing material to obtain the required value of area is implemented with the standardized paper photocopy of the said prototype paper sheet or other like drawing material.

4. Device for the automatic determination of the area of drawings of any shape depicted onto a paper sheet or other like drawing material in accordance to the above claim 1, where the said transparent table, upon which the paper sheet or other like drawing material is mounted, is based onto a weighing scale which is thereby used in the weight measurement, at first of the entire said paper sheet or other like drawing material to determine the coefficient of correlation of its weight to the drawing area and secondly of a portion cut-off from said paper sheet or other like drawing material whereupon the drawing the area of which has to be measured is depicted, where said weighing scale extends to an electornic area calculator by means of which the necessary arithmetic actions are made to calculate first said coefficient of correlation of the weight to the area of said paper sheet or other like drawing material and secondly the area of the cut-off portion of said paper sheet or other like drawing material, given the measured weight of said cut off portion and the previously defined said coefficient of correlation.

* * * * *